Sept. 24, 1957   L. HERMANN ET AL   2,807,478
RESILIENT SIDE OR BRANCH FITTING FOR IRRIGATION MAINS
Filed Nov. 15, 1954   2 Sheets-Sheet 2
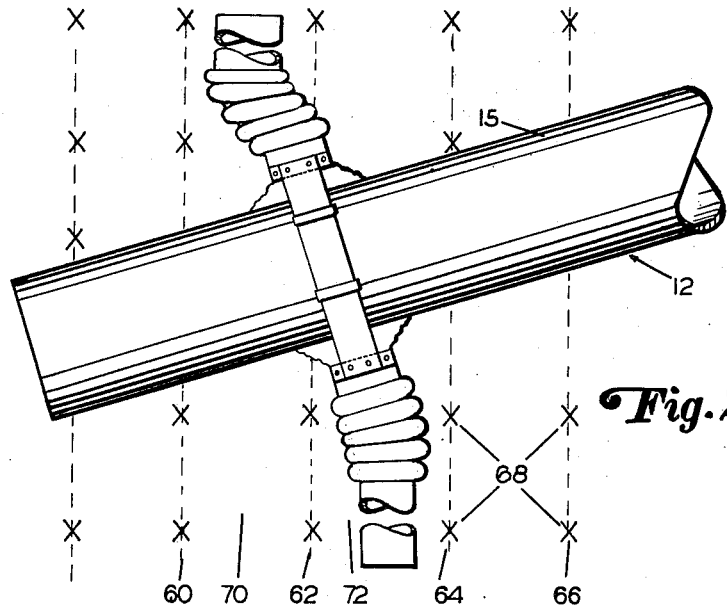
Fig. 2.
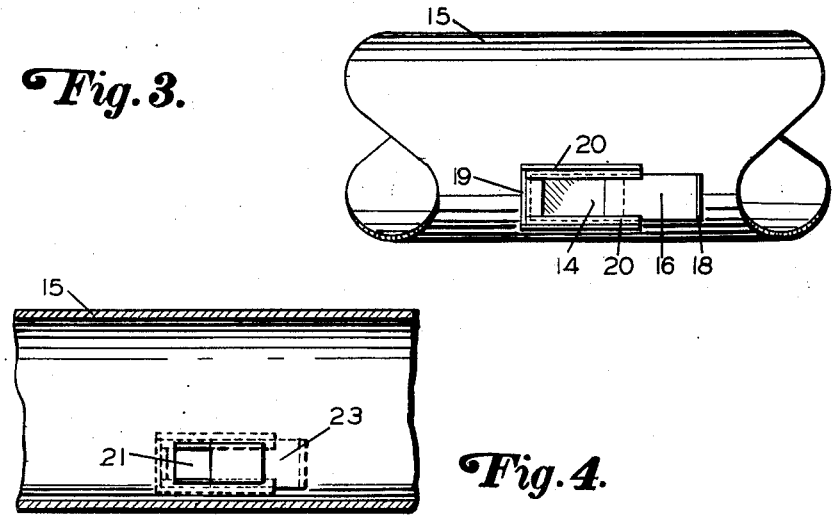
Fig. 3.
Fig. 4.
INVENTOR.
Leon Hermann and
O'Dale Hermann
BY Arthur H. Sturges
Attorney

United States Patent Office 2,807,478
Patented Sept. 24, 1957

2,807,478

RESILIENT SIDE OR BRANCH FITTING FOR IRRIGATION MAINS

Leon Hermann and O'Dale Hermann, Bruning, Nebr.

Application November 15, 1954, Serial No. 468,869

3 Claims. (Cl. 285—5).

The instant invention relates to the art of irrigating crops and more particularly to corn fields.

It is an object of the invention to provide a device which, during use, will irrigate a large number of corn rows simultaneously.

Another object of the invention is to provide an irrigation device through the use of which a boring of holes in the soil by the irrigating water is prevented.

A further object of the invention is to provide a device which may be readily attached to or removed from an irrigating pipe and which is so constructed that different diameters of pipes may be accommodated.

A still further object of the invention is to provide an irrigation device, the outlet end portion of which may be disposed in a valley between two corn hills for irrigating purposes, while at the same time the feed pipe for supplying said outlet is disposed at an angle of inclination across and with respect to the corn rows of a field.

An important object of the invention is to provide an irrigation device for the foregoing outlined purposes which cooperates with oppositely disposed outlets of a water supply pipe of arcuate contour in cross section.

Other and further objects and advantages of the invention will be understood from the following detailed description thereof.

In the drawings:

Figure 2 is a top plan view of the new device attached to a portion of an irrigating pipe, the latter being disposed obliquely or at an angle of inclination upon the soil and with respect to the longitudinal length of corn rows of a corn field.

Figure 3 is a side view of a portion of the said pipe, showing a slideable gate valve thereof.

Figure 4 is a view similar to Figure 3 and showing said portion of the pipe in longitudinal section and depicts a further gate valve which is oppositely disposed on said pipe with respect to the gate valve shown in Figure 3.

Figure 1:
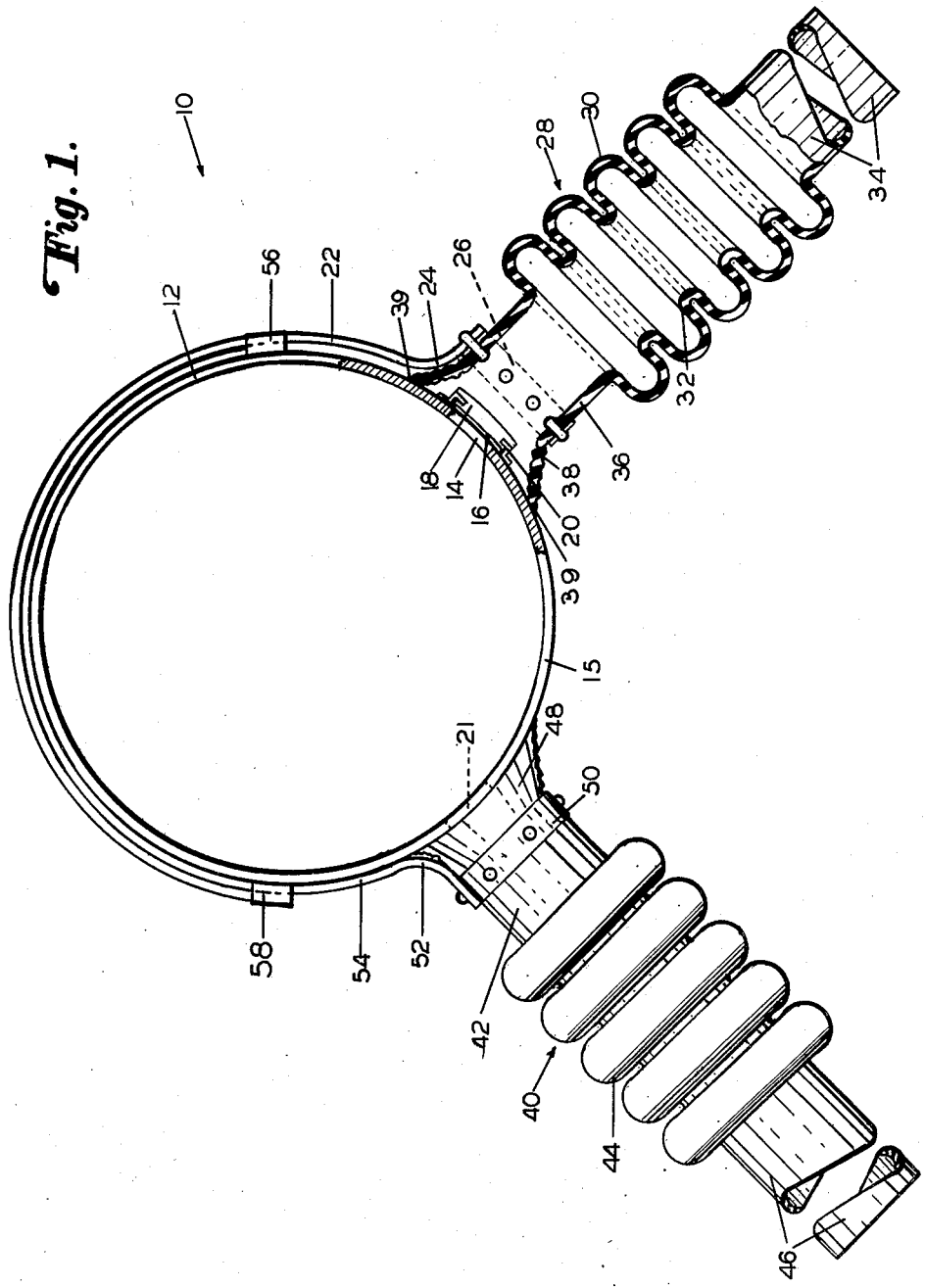
Figure 1 is an end view of an irrigating pipe and showing a preferred embodiment of the invention applied thereto in a position of use, certain parts thereof being broken away and other depicted in section.

It is well known that as heretofore practiced, irrigation conduit pipes, while resting upon the soil, discharge water from the outlets of said pipes in a steady stream, as is essential, and often with an appreciable amount of pressure, whereby the streams of outlet water, upon gushing from said outlets at the sides of an irrigation pipe, dig undesired holes in the soil. Furthermore, the earth removed from the holes washes down the valleys between the oppositely disposed corn hills and often plugs said valleys with said soil removed from the holes by attrition and the force of the water under pressure, and the instant invention aims to provide a device, the outlet end portion of which is so arranged that the force of said water issuing therefrom is dispensed in a horizontal direction and gently, whereby the washing away of topsoil and digging of holes in the soil is obviated.

While one embodiment of the invention is illustrated in the above referred to drawings, it is to be understood that they are merely for the purpose of illustration, and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 indicates the entire invention and 12 indicates an end of one section of a length of irrigating pipes which include the pipe 15. It will be understood that the section 12 may be of any suitable length and that the end of said section is provided with an annular bell, not shown, for receiving therein the plain end of a next adjacent section whereby the total length of a conduit comprised of said sections may extend from a source of supply of water, such as a river or the like, to and across a corn field for serving the latter with water.

The pipe 15 is provided with an outlet port 14 which, as best shown in Figure 3, is provided with a slideable gate valve or door 16. The door 16 is provided with a portion 18 at one end thereof which is disposed outwardly from the door 16, as best shown in Figure 1. The portion 18 provides a handle for manipulating the door to a closed or open position, and said door is arcuate in cross section to conform to the cross sectional curvature of the pipe or conduit 15. The door 16 is provided with oppositely disposed guide tracks 20 for maintaining the door snugly against the side of the conduit, and a like track or detent 19 is disposed between ends of the guide tracks 20 for receiving an end portion of the door therein for preventing an undue leakage of water at the time the door or gate valve 16 is in a closed position with respect to the pipe 15.

Referring to Figure 4, the pipe 15 is depicted in section having an outlet port 21 which is oppositely disposed with respect to outlet opening 14. The outlet 21 is similarly provided with a door or gate valve 23, which is slideable between its tracks. As thus described, it will be understood that at times when the pipe 15 is disposed transversely across and upon a corn field surface, and more particularly upon the top of corn hills thereof, and in a manner whereby the pipe is disposed at a right angle with respect to the length of the corn rows of said field that the outlet ports 14 and 21 serve the same valley with water between oppositely disposed corn rows, said water being discharged in opposite directions from the pipe simultaneously. It will be further understood that the outlet ports 14 and 21 are spaced along the pipe 15 a distance complemental to the spacing apart of the said corn rows, whereby each pipe section 15 serves any given number of valleys between said rows simultaneously in accordance with the length of said pipe.

At times when the pipe 15 is disposed obliquely with respective said corn rows and as necessity may require for obtaining water from a river or the like, the new device accommodates the said condition as later described herein.

The new device includes a resilient band 22, formed of suitable spring metal which encircles a portion of the pipe 15, and since said band is resilient, it closely clings to the adjacent portion of the arcuate side wall portion of the pipe 15 for supporting the further portions of the new device.

It will be understood that the band 22 will cling to the pipe irrespective of the diameter of said pipe, since the pipe is of conventional size such as eight to fourteen inches in diameter.

One end of the band is provided with an offset portion 24 which is disposed substantially at a right angle with respect to the longitudinal axis of the pipe 15.

Adjacent the terminal end of the portion 24, a collar 26 is provided being secured thereto by any suitable means, such as riveting, welding, or the like. The collar is preferably circular in plan. The collar is secured to a throat 36 having a receiver mouth 38. The lips 39 of said mouth are disposed about the slideable gate valve 16 and the tracks of the latter at times when said gate is open. The throat is formed of flexible resilient material and as depicted in Figure 1, the walls of said throat are shown wavy in outline for denoting that said walls are deformed from a normal condition at times when the lips 39 of the throat are compacted against the arcuate side wall of the pipe 15 by means of the inherent resiliency of the spring or resilient band 22. Since the terminal free end of the spring is disposed more than half way around the pipe 15, the spring clings in an operative position to said pipe for compacting said lips.

The new device further includes a flexible connection 28 which may be formed integral with the throat 36 and also with an elongated boot 34 being disposed between said boot and an end of said throat.

Preferably the boot 34, the connection 28, and said throat are formed of rubber or rubberized canvas, the mouth of said throat being formed primarily of rubber.

The connector 28, as best shown in Figure 1, preferably includes a plurality of flexible juxtaposed portions 30, the outwardly disposed ends of which are approximately semicircular in cross section, said sections being joined together by means of smaller inwardly disposed semicircular portions for providing the said bellow-like arrangement of parts for the connector 28 and for facilitating a moving of the outwardly disposed end of the connector to a selected position for purposes later described. The smaller semicircular portions 32 normally space the larger semicircular portions 30 away from each other and evenly at times when the latter are disposed in alignment with respect to each other, as shown in Figure 1.

The boot 34 is of any desired length sufficient to conduct irrigating water away from the pipe 15 a distance such that said water will flow into a valley between two corn hills gently.

The boot 34, the connector 28, the throat 36, and the receiver mouth 38 provide a conduit for distribution of water from the pipe 15 to a valley between two corn hills. A like conduit is provided for the outlet port 21 of the pipe, said outlet being oppositely disposed to the outlet 14 of said pipe, the outlet 21 being represented by broken lines in Figure 1. The conduit 40 includes a throat 42, a flexible connector 44, an elongated boot 46, and a mouth 48. A further ring 50 is disposed around the throat 42, said ring being attached to the offset end 52 of a further spring or resilient band 54 employed.

As best shown in Figure 1, the free ends of the bands 22 and 54 overlap each other, said ends each being provided with like yokes 56 and 58 respectively. The yokes encircle the adjacent bands or springs whereby said springs are slideably connected together.

At times when the conduits are attached to a pipe the diameter of which is greater than the pipe 15, the yokes are disposed closely together than is shown in Figure 1, and at times when an irrigation pipe of lesser diameter than the pipe 15 is used, the said yokes are disposed further away from each other correspondingly and complemental to the diameter of a given irrigation pipe.

Referring to Figure 2, the numerals 60, 62, 64, and 66 indicate spaced-apart rows of growing corn, said rows being represented by means of broken lines. The numeral 68 indicates spaced-apart stalks of growing corn, said stalks being represented diagrammatically by means of "X" marks on the drawing.

The numerals 70 and 72 indicate the valleys between said corn rows or corn hills. The valleys and corn hills are formed during a plowing of a corn field prior to planting of corn seeds in said hills.

At times when the pipe section 15 is disposed at a right angle with respect to the longitudinal length of said valleys, the conduits of the new device are disposed in alignment with one of said valleys for a discharge of water through said conduits and outwardly of the boots of said conduits as received from the outlet ports of the pipe 15, and in opposite directions for irrigating a single valley.

At times when the pipe 15 is disposed inclinedly with respect to said valleys as shown in Figure 2, water is discharged from the pipe 15 into two valleys simultaneously and in opposite directions, since the flexible connectors of said conduits or bellows are formed to permit the same, as shown in Figure 2. For this purpose the bellows become compressed on one of their sides and expanded on their other sides.

It will be understood that further outlet ports are provided for the pipe 15 which are spaced apart longitudinally of the pipe 15 and with respect to the outlet ports 14 and 21 whereby several valleys may be irrigated simultaneously by providing duplications of the new device shown in Figure 1, for the said purpose.

From the foregoing specification, it will become apparent that the invention disclosed will adequately accomplish the functions for which it has been designed and in an economical manner and that its simplicity, accuracy and ease of operation are such as to provide a relatively inexpensive device, considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

I claim:

1. In combination with an irrigation pipe having an outlet port disposed through its arcuate side wall a branch means comprising a throat having a mouth, said mouth being of greater cross-sectional area than the port and being formed of resilient material for permitting the lips of said mouth to be compacted snugly against said wall of said pipe and completely surrounding said port; means for attaching said throat to said pipe for maintaining said mouth in the said position for permitting irrigating water to flow through said port into and through said throat; said means for attaching the throat to the pipe including a collar fixedly circumposed on said throat; and a substantially semi-circular spring, one end of the spring being secured to said collar, the other end of said spring being disposed more than half way around said pipe, the main body portion of said spring being normally of a lesser diameter than said conduit for causing said spring to grip the outer wall of the pipe during an irrigation operation; an elongated hollow boot having open ends; and a flexible tube connecting said throat and one end of said boot for permitting the latter to be inclinedly disposed with respect to the longitudinal axis of said pipe.

2. In combination with an irrigation pipe having an outlet port disposed through its arcuate side wall a branch means comprising a throat having a mouth, said mouth being formed of resilient material for permitting the lips of said mouth to be compacted snugly against said wall of said pipe and about said port; means for attaching said throat to said pipe for maintaining said mouth in the said position for permitting irrigating water to flow from said pipe through said throat, said means comprising a collar fixedly circumposed on said throat, a semi-circular spring, one end of said spring being secured to said collar, the other end of said spring being disposed more than half way around said pipe, the main body portion of said spring being normally of a lesser diameter than said conduit for causing said spring to grip the outer wall of the pipe; an elongated hollow boot having open ends; and a flexible tube connected between said throat and one end of said boot for permitting the latter to be inclinedly disposed with respect to the longitudinal axis of said pipe during an irrigation operation.

3. A device as defined in claim 2 in which the tube is of bellows-like construction and is integral with the throat and the boot.

References Cited in the file of this patent

UNITED STATES PATENTS

| | | |
|---|---|---|
| 796,695 | Blake | Aug. 8, 1905 |
| 1,057,708 | Chapin | Apr. 1, 1913 |
| 1,261,213 | Clay | Apr. 2, 1918 |
| 1,345,971 | Star | July 6, 1920 |
| 1,480,936 | Gonder | Jan. 15, 1924 |
| 1,597,635 | Stickdorn | Aug. 24, 1926 |
| 1,804,874 | Hribar | May 12, 1931 |
| 2,456,636 | Jones | Dec. 21, 1948 |
| 2,650,113 | Brace | Aug. 25, 1953 |

FOREIGN PATENTS

| | | |
|---|---|---|
| 14,067 | Great Britain | June 9, 1897 |
| 353,520 | Great Britain | July 27, 1951 |
| 1,030,538 | France | Mar. 11, 1953 |